United States Patent [19]

Höfle et al.

[11] Patent Number: 4,547,105
[45] Date of Patent: Oct. 15, 1985

[54] QUICK-CHANGE CHUCK

[75] Inventors: Lothar Höfle, Ostfildern; Veit Autenrieth, Dettingen/Teck, both of Fed. Rep. of Germany

[73] Assignees: Reiner Bilz; Axel Bilz, both of Ostfildern, Fed. Rep. of Germany

[21] Appl. No.: 610,874

[22] Filed: May 16, 1984

[51] Int. Cl.$^4$ .............................................. B23G 3/00
[52] U.S. Cl. .................................. 408/141; 10/89 F; 10/141 H; 408/239 R
[58] Field of Search .......... 408/139, 140, 141, 239 R; 10/89 F, 141 H

[56] References Cited

U.S. PATENT DOCUMENTS 3,751,051  8/1973  Schmidt ........................... 408/239 X
4,274,768  6/1981  Kato .................................. 408/139 X Primary Examiner—James M. Meister
Attorney, Agent, or Firm—Michael J. Striker

[57] ABSTRACT

A quick-change chuck for holding a tap of a tap drill comprises a member connectable to the spindle of the drill and a chuck head for holding the tool. The chuck is further provided with the device for an axial compensation for a difference between the spindle stroke and the pitch of the thread of the tap drill. This device includes a compression-responsive device which makes possible an axial compensation in the case of the compression force directed towards the spindle-receiving member, and a separate independent tension-responsive device which makes possible an axial compensation when a tension force acts on the chuck in the direction away from the spindle-receiving member. Each axial compensation device includes axially displaceable balls positioned in axial cylindrical passages provided in the spindle-receiving member and the chuck head, respectively.

22 Claims, 3 Drawing Figures

QUICK-CHANGE CHUCK

BACKGROUND OF THE INVENTION

The present invention relates to quick-change chucks in general, and more particularly to quick-change chucks for thread-cutters.

Conventional quick-change chucks comprise an extension-compensating or adjusting device which adjusts the chuck in the axial direction during the axial compression and the axial tension. The compression-compensating device and the tension compensating device can be combined in one device. This device is positioned in the lower region of the chuck head between the chuck head itself and the casing receiving a quick-exchange insert which holds the end of the tool. The chuck head is a one-piece structural component with the receiving member, which has a shaft which merges into a chuck head-cylindrical wall of a greater diameter. The cylindrical wall of the chuck head has an internal opening in which the above-mentioned casing is received. Both pressure-loaded springs for the compression and tension compensation are positioned within the bore provided in the receiving member and are supported against the element rigidly connected with the casing. This conventional quick-change chuck makes an axial longitudinal adjustment or compensation possible either under the compression loading or under the tension loading.

Individual situations, in which such an axial compensation is required, are known. The disadvantage of the aforedescribed quick-change chuck is that the maximally possible longitudinal compensation is relatively small as compared to the length of the chuck. Efforts have been made to compensate substantially large axial lengths of the chucks by means of a length-compensation device. Such a device is desired, for example when a cored hole is unintentionally not drilled and the thread-cutting process should continue without, however permitting tap drills to be cracked and the workpiece and the chuck to be damaged. Efforts have been made in such cases to permit the machine cycle to be continued, and the axial length compensation, here during the pressure-loading, must be carried out over the entire machine stroke. Such a situation then becomes similar to the situation when during the cutting of a thread in a predrilled hole the tap drill is uniformly clampled from the start and the torque coupling in the quick-change insert is released so that the torque is not translated to the tap drill. Then the following stroke of the machine spindle is compensated practically over the entire stroke path via the axial compensation in the chuck. The same situation occurs in the reverse rotation direction, for example when the tap drill, upon reaching the bottom of the hole and at the end of the work stroke must be there clamped. When the torque coupling in the quick-change insert is released an undisturbed withdrawal of the machine-side components can be obtained whereby the path difference is compensated via the tension-loaded length-compensation device. Upon passing over the entire compensating length the quick-change insert positioned in the casing of the chuck head becomes axially uncoupled so that this insert can remain, together with the tap drill, on the workpiece, whereas the machine spindle together with the quick-change chuck, will be moved away from the workpiece. A greater axial length-compensation is then also necessary. Inasmuch as the chuck head is formed as a single piece with the spindle-receiving member a complete quick-change chuck must be manufactured for each type of the machine spindle. This leads to high costs of the quick-change chucks. At least one torque-transmitting ball of the length-compensating device for compensating a compression and tension is held in one slot within the cylindrical wall of the chuck head, this slot extending over the entire length of that cylindrical wall. This means that the torque-transmitting ball is supported against the wall of the slot in the cylindrical wall in a point-like manner. Therefore the balls for translating torque in such arrangements are soon damaged. The base of the slot is also worn out. Thus the whole quick change chuck becomes worn out. Furthermore, the torque-transmitting balls must be supported in the chuck with a somewhat radial play. Upon the action of great radial forces there is a danger that the torque-transmitting balls could be displaced and clamped within the chuck, which is also possible due to the above mentioned point-like contact of the balls with the base of the slot. The whole length-compensating device then becomes jammed, or at least it is operated with difficulties. The wearing elements of the quick-change chuck are positioned between the casing and the chuck head. In the case of wear of any of the elements the whole quick-change chuck must be exchanged for a new one.

SUMMARY OF THE INVENTION

It is an object of the present invention to provide a quick-change chuck which would avoid the above disadvantages of conventional chucks of the type under discussion.

This and other objects of the present invention are attained by a quick-change chuck for a thread cutting tool, comprising a spindle-receiving member for receiving a spindle connected to a machine tool and having a central axis and a free end; a chuck head connected to said free end and having a cylindrical opening axially aligned with said spindle-receiving member; a casing inserted in said opening and releasably coupled with said chuck head; a quick-change insert for holding a thread cutting tool and insertable in said casing, said insert being formed with a peripheral circular groove; at least one holding ball engaged in said circular groove, said insert being held in said casing and axially coupled with said casing by said holding ball; means for an axial compensation for a difference between the spindle stroke and the pitch of the thread of the thread cutter and positioned between said spindle-receiving member and said casing; at least one return spring positioned between said spindle-receiving member and said chuck head, said axial compensation means enabling an axial displacement of said spindle-receiving member relative to said casing in both axial directions under an extension or contraction against the action of said return spring; and means for transmitting a torque from said chuck head to said casing and including torque-transmitting balls, said casing having at least one axial groove receiving said torque-transmitting balls, said length-compensation means including a compression-compensating device which compensates for a compression force of said spring, directed towards said spindle-receiving member, and an independent tension-compensating device which compensates for a tension force of said spring, directed away from said spindle-receiving member.

The proposed quick-change chuck is effective even with very small dimensions of the chuck and provides for a great axial length compensation for the compression force and for the tension force as well. The device is wear-resistant and can easily translate great torques during the operation of the length-compensating device and without the danger that the torque-transmitting ball would be clamped within the device. The costs of manufacturing of the length-adjusting device can be reduced and the device can be adjusted to various constructions of the machine spindles and to various types of the chuck heads.

Due to the provision of separate and independently operated devices for compensating for the compression and the tension it is achieved that a very large axial length-compensation is obtained, which corresponds to an average stroke of the spindle during the cutting threads in normal holes. At the same time the axial construction length of the quick-change chuck and its outer diameter can be as small as possible. Due to the largest possible length-compensation the whole required stroke of the machine spindle is entirely compensated in the direction of the compression even in the case of a non-drilled cored hole during the thread cutting. The similar situation occurs in the opposite direction in the case of tension. Owing to the provision of two independent length-compensating devices these individual length-compensating devices are so formed that the danger of clamping the torque-transmitting balls within each device does not exist in the chuck even with great radial forces but the axial compensation process runs very smoothly. Thus the service life of the chuck is substantially increased.

The spindle-receiving member may have a central bore, the chuck head being axially displaceable in and releasable from said central bore, the cylindrical opening of the chuck head being coaxial with said central bore. Thus, according to the invention the one structural element, namely the receiving member, serves the purpose of receiving the spindle whereas another structural component, namely the chuck head, receives a tool holder, and these two components can be independently assembled and stored. Therefore, the chuck can be adjusted to various shapes of the spindles independently from the construction of the chuck head whereas the chuck head itself can be formed so as to be adjusted to a number of types of tools independently from the construction of the spindle-receiving member. The number of component parts and thus costs of manufacturing are reduced in the quick-change chuck according to the invention as compared to those known in the art. Furthermore, a user himself can combine various types of the spindle-receiving member with any type of a selected chuck head.

Due to the provision of two separate parts of the chuck various combinations are possible, which also leads to the reduction of costs. Since the most wearable elements of the chuck are positioned in the chuck head the spindle-receiving member can be used even in the chuck head that has been exchanged. This further reduces expenses. The chuck head, on the other hand, is accessible for repair if necessary. The chuck head can be quickly and easily disassembled and then again assembled. The guiding elements between the head chuck and the spindle-receiving member ensure a sufficient guide length and a reliable guidance into the expanded state and contracted state of the chuck whereby an accuracy and an alignment of the tap drill during the operation are ensured.

Separate axial compensating devices for the compression of the chuck, on the one hand, and for the tension or expansion of the chuck, on the other hand, make it possible that these devices can be individually formed, for example the compression-responsive compensating device can be provided with two or more superposed balls for enhancing the torque translation whereas the tension-responsive compensating device may have only one ball.

The compression-compensating device may be arranged between the spindle-receiving member and the chuck head. The compression-compensating device can be placed in the spindle-receiving member and formed such that a sufficient length within that member would be available for a large axial length-compensation.

The chuck head may include a cylindrical shaft axially guided in said central bore, said shaft having at least one outer axial semicylindrical groove, said spindle-receiving member having at least one inner axial semicylindrical groove formed opposite to said outer axial groove so that together said outer and inner grooves form a cylindrical passage, and wherein at least one torque-transmitting ball is provided, supported in said cylindrical passage, the aforementioned return spring being an axially compressible compression spring arranged between the spindle-receiving member and the chuck head.

The cylindrical shaft may be hollow and has an interior which is open into said central bore, said compression spring being positioned in the hollow cylindrical shaft and extended partially outwardly therefrom into said central bore, said compression spring having one end and another end, said cylindrical shaft has a bottom surface supporting one end of said compression spring, said spindle-receiving member having in the region of said central bore an abutment supporting said another end of said compression spring.

The quick-change chuck may further include a sleeve inserted in said central bore and surrounding said cylindrical shaft, said sleeve being axially supported in said central bore below said inner axial groove of said spindle-receiving member and forming an end stop for said at least one torque-transmitting ball upon an axial displacement of the chuck head by means of the compression spring in the direction away from the spindle-receiving member.

The sleeve may be locked in one axial reference position relative to said spindle-receiving member, said sleeve being releasable and removable from said central bore.

The quick-change chuck may further include a threaded screw, said spindle-receiving member having a radial threaded bore receiving said screw, said sleeve having a radial hole aligned with said threaded bore which extends radially up to said radial hole. The threaded screw may be hollow. This screw is adapted to hold the aforementioned sleeve in one locked position. If any of the elements are to be replaced by new one, the chuck is dismantled by releasing that screw and pulling out the sleeve from the spindle-receiving member, whereby the chuck head can be released from the spindle-receiving member, and any element can be exchanged.

The chuck can further include a cross-bearing pressure-amplifying device including an adjustable spring radially extended in said hollow screw, a ball loaded by a force of said spring in a radial direction, said cylindrical shaft being formed at an outer periphery thereof with a recess, said loaded ball being engaged in said recess and being pushable away from said recess upon a relative displacement between said spindle-receiving member and said chuck head against the action of the force of said adjustable spring when an axial force of the compression spring is exceeded.

The aforementioned loaded ball together with said adjustable spring may be held within said hollow screw, and wherein an inner hexagonal screw is inserted into said hollow screw for adjusting said adjustable spring.

The chuck head may include a cylindrical portion integral with said cylindrical shaft and provided with said cylindrical opening, said cylindrical portion having an inner wall, said tension-compensating device being positioned between said inner wall and said casing inserted in the cylindrical opening in that portion of the chuck head.

Said cylindrical portion may have at least one inner axial semicylindrical groove and said casing has at least one outer axial semicylindrical groove formed opposite to said inner axial groove so that together said inner and outer grooves form another cylindrical passage, and said tension-compensating device including at least one further torque-transmitting ball engaged in said another cylindrical passage, and a tension spring positioned between said chuck head and said casing, said tension spring being axially compressible and acting against the force of said compression spring.

Due to the provision of the substantially cylindrical passages for balls the torque-transmitting balls in those passages are not strongly loaded. This enhances the service life of the balls and the grooves. The danger of blocking the balls within the passages is substantially reduced. Furthermore an accuracy of the thread being cut by a tap drill held in the chuck is significantly increased.

Said further transmitting ball may be held in the cage which is a guide sleeve axially immovably positioned in said cylindrical opening between said casing and the cylindrical portion of the chuck head.

The guide sleeve may be formed with an axial elongated slot, said holding ball engaged in said circular groove being radially extended into said elongated slot. Thereby it is achieved that the ball or balls positioned in the casing are not on the way of the balls in the cage in the tension-compensating device and can function independently; the diameter of the chuck head should not, however, be enlarged to accomodate all the balls.

The cylindrical shaft may have an inner guide bore coaxial with said central bore, said casing including an elongated pin coaxial with said cylindrical opening, said pin being guided in said guide bore, and wherein a holding screw is provided which is positioned in said hollow cylindrical shaft, said holding screw having a stop collar axially spaced from said pin, said cylindrical shaft having an inner bottom surface, said collar abutting against said bottom surface under the limiting of the length of said axial displacement.

The tension spring may be positioned within said hollow cylindrical shaft and coaxially with said compression spring, said holding screw having an end stop abutment, said tension spring having one end supported against said stop abutment and another end supported against said inner bottom surface.

The chuck may further include a stop ring positioned on said bottom surface and supporting said another end of said tension spring.

The chuck head may have an outer abutment surface in a transition zone between said cylindrical shaft and said cylindrical portion, said spindle-receiving member having a stop surface facing said abutment surface, said abutment surface, under the limiting of the axial displacement, abutting against said stop surface.

The compression spring and the tension spring are concentrically arranged relative to each other and the bottom inner surface of the cylindrical shaft of the chuck head forms a support surface for the both springs. Such an arrangement ensures the absence of an axial play in the quick-change chuck.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
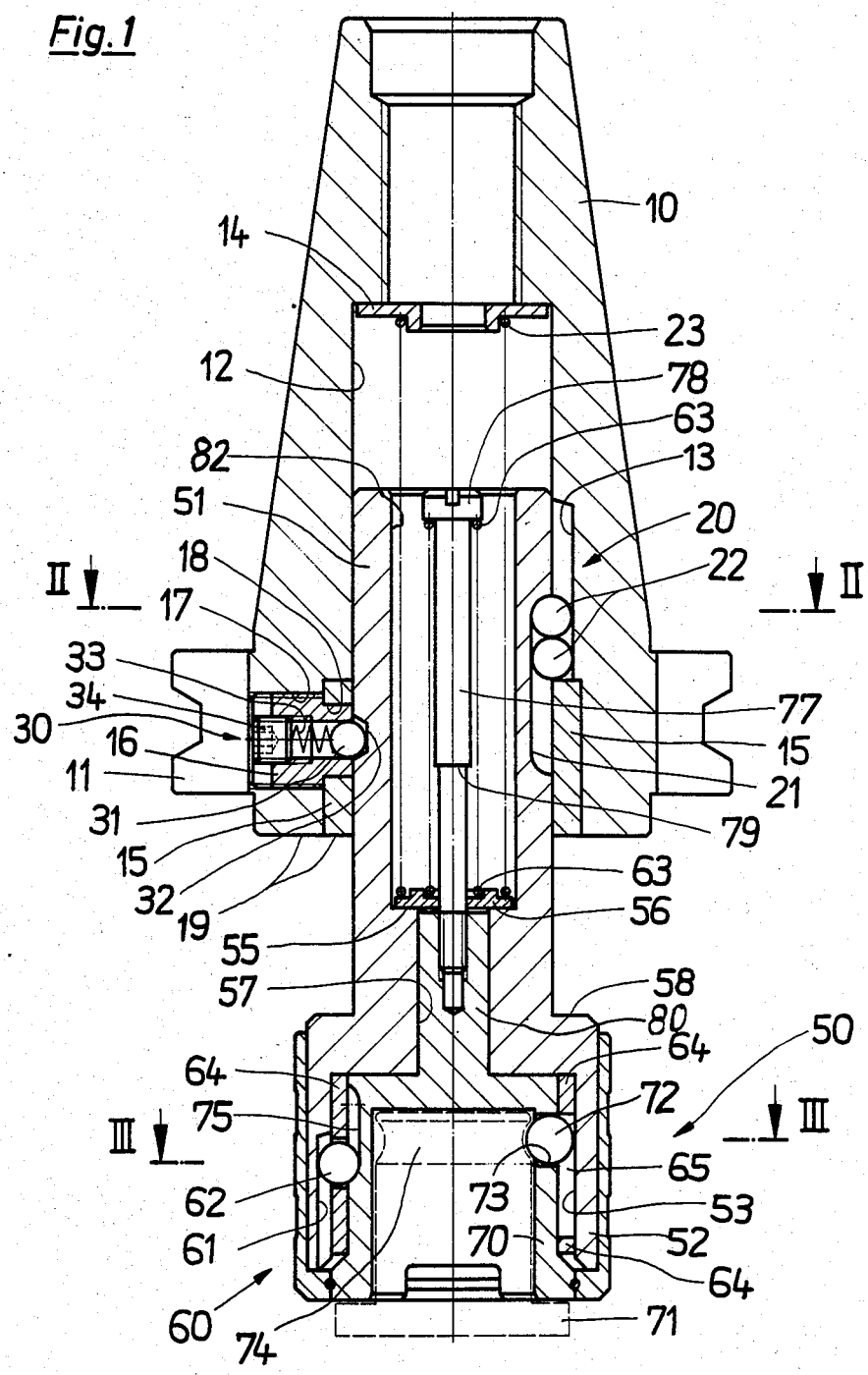
FIG. 1 is an axial sectional view through the quick-change chuck according to the invention.
Figure 2:
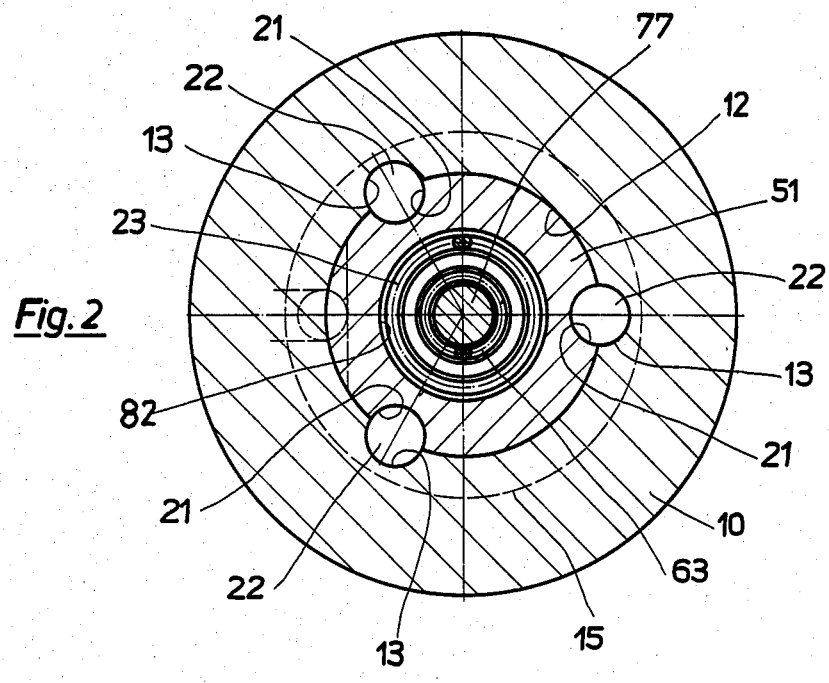
FIG. 2 is a cross-section taken along line II—II of FIG. 1.
Figure 3:
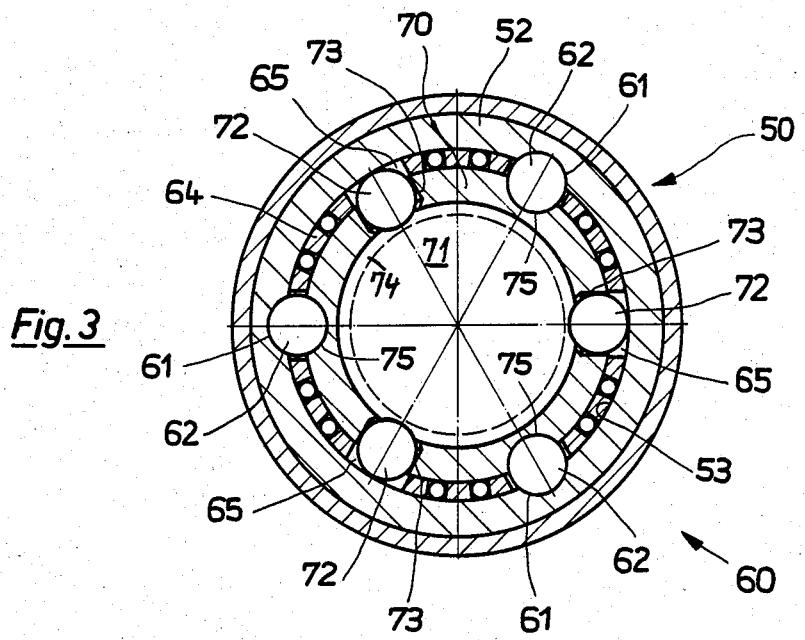
FIG. 3 is a cross-sectional view taken along line III—III of FIG. 1.

Referring now to the drawings in detail it will be seen that the quick-change chuck of the invention includes a chuck head generally designated by reference character 50 and a spindle-receiving member 10, at the upper end of which the end of a non-illustrated sprindle of the machine tool is inserted and the lower end of which receives the chuck head 50. The quick-change chuck is vertically suspended on the spindle guide of the machine tool. In the exemplified embodiment the spindle-receiving member 10 has a stepped axial central bore 12 and a conical outer periphery. An outer collar 11 is provided at the lower end portion of receiving member 10. This collar serves the purpose of engaging with the grippers of the tool exchange device.

The chuck head 50, the upper portion of which is received in the central bore 12 of the spindle-receiving member 10, is axially displaceable in and releasable from spindle-receiving member 10. Chuck head 50 can be interchanged with a new one. The chuck head 50 includes a cylindrical shaft 51 which has an upper portion 76 of the smaller outer diameter and a lower portion 52 of a greater outer diameter. The lower portion 52 is coaxial with the upper portion 76 and is formed with a downwardly open opening or recess 53.

A casing 70 is releasably inserted into the opening 53. This casing 70 is coupled with the chuck head 50. As can be seen from FIG. 1 a quick-change insert 71 shown by the dotted line is inserted into the casing 70 in which a threaded bore is formed. The quick-change insert 71 is supported in its axial position in casing 70 by means of a number, for example three, holding balls 72 which are distributed along the circumference of casing 70. Holding balls 72 are positioned in a transversal bore 73 formed in the casing 70 and protrude to the interior of casing 70. Holding balls 72 are also engaged in a circular groove 74 formed in the outer face of the quick-change insert 71. Thereby the quick-change insert 71 is axially held in casing 70. The torque-translating connection is carried out by means of the non-illustrated upwardly extended engaging projections on the quick-change insert 71 which are engaged in a form-locking fashion with corresponding downwardly extended recesses formed in the casing 70.

Between the spindle receiving member 10 and the casing 70 is arranged an adjusting or compensating device for the axial adjustment which makes it possible that the spindle-receiving member 10 and casing 70 be axially displaced relative to each other in the both axial directions and against the force of compression or expansion of at least one return spring. Thereby an axial adjustment in the direction of elongation upon the expansion and the compression of the spring is obtained to compensate for an eventual difference between the machine-side positively actuated stroke, with which the quick-change chuck is loaded from the machine spindle, and the inclination of the thread course of the tap drill, and also during the thread cutting and during the rotating of the tap drill out of the bore being tapped. The tap drill can be cut in the workpiece independently from the stroke of the machine spindle and thereafter be pulled out from the hole in the workpiece by rotation of the drill. In the event that a drilled hole is not provided and with the positively actuated machine stroke, the axial compensation prevents defects in the threads and allows to avoid standstills of the machine. The advantages of such axial-adjustment devices are known in the field of the invention. The axial-adjustment or compensation device has the torque-translating means in the form of axial grooves and axially movable balls positioned in those grooves. Further specific features of the device for axial compensating in the longitudinal direction will be explained in detail hereinafter.

The lengthwise axis-adjustment device includes an axial-compression compensating device 20 which makes possible an axial adjustment of the spindle-receiving member 10 to a compression force acting on the receiving member. This axial compression-compensating device 20 is arranged between the receiving member 10 and the chuck head 50 axially displaceable relative to spindle-receiving member 10.

The axial adjustment or compensation device further includes a separate and independent from the aforementioned compression-compensating device tension-compensating device 60 which makes possible an adjustment of the receiving member 10 to a tension force acting on spindle-receiving member 10. The tension-adjusting device 60 is arranged between the chuck head 50, namely its lower cylindrical portion 52, and the casing 70 inserted into the chuck head 50.

The cylindrical shaft 51 has, on its outer peripheral surface, at least one (preferably three) axially extended semicylindrical groove 21. In the case of a number of grooves 21 these grooves are uniformly circumferentially spaced from each other. Groove 21 corresponds to an axially extended, also approximately semi-cylindrical groove 13 formed in the inner surface defining the bore 12 in the receiving member 10. Both axial grooves 21 and 13 form together a somewhat cylindrical passage in which at least one torque-translating engaging ball 22 is positioned. Two torque-translating balls 22, one positioned on the other, are shown in the exemplified embodiment of the invention. At least one compression spring 23 in the form of the cylindrical helical spring is arranged between the spindle-receiving member 10 and chuck head 50.

Cylindrical shaft 51 is hollow. The inner opening of shaft 51 opens into bore 12 of spindle-receiving member 10. The compression spring 23 extends into the inner opening of hollow cylindrical shaft 51 and is supported there against a ring 56 positioned on the bottom 55 of that inner opening. Compression spring 23 supported against ring 56 at one end thereof is projected outwardly axially into the bore 12 and is supported at its other end at the axial distance from the end of shaft 51 and against a washer 14 mounted at the step of central bore 12.

A sleeve 15 is inserted from the lower end of receiving member 10 into its central bore 12 after the insertion into that bore of the compression-adjusting device 20 and the end portion of the cylindrical shaft 51. Sleeve 15 closes from below the downwardly open axial groove 13 of spindle-receiving member 10 and forms an end stop or support for engaging balls 22 when, by means of the compression spring 23, the chuck head 50 is pressed from receiving member 10. This position is shown in FIG. 1. The chuck head 50 is at the same time secured against a possible pulling of the chuck head away from the receiving member 10. The sleeve 15 simplifies manufacturing of axial groove 13. Sleeve 15 is locked in its inserted portion in a form-locking manner by means of a screw 16 formed as a hollow screw, which extends through a radial threaded bore 17, provided in the spindle-receiving member 10, into the radial opening 18, formed in the sleeve 15 and coaxial with the bore 17, and is engaged in that opening 18. To disassemble sleeve 15 from the receiving member 10 screw 16 is rotated out from bore 17. Then the chuck 50 can be together with sleeve 15 pulled out downwardly from central bore 12 of the spindle-receiving member 10.

The quick-exchange chuck is further provided with a cross-bearing pressure-amplifying device 30. The latter includes a ball 31, which is engaged in a peripheral recess 32 of at least insignificant depth, provided in the cylindrical shaft 51, and a radially projecting spring 33 which is prestressed. The radial spring 33 is supported in the receiving member 10 by a supporting element, for example in the form of an inner hexagonal screw 34, and the initial stressing force of spring 33 can be adjusted. Owing to the construction of the screw 16 in the form of the hollow screw ball 31 and spring 33 are positioned within that screw and the inner hexagonal screw 34 is threaded into the inner thread of hollow screw 16.

The tension-compensating device 60 is constructed in the following manner.

The lower cylindrical portion 52 of shaft 51 has at least one semicylindrical axial groove or recess 61. Three axial grooves 61 uniformly circumferentially spaced from each other are shown in the preferred embodiment. Each axial groove 61 corresponds to the outer axial groove 75, also somewhat semicylindrical, and formed in the outer peripheral surface of the casing 70 inserted into the cylindrical portion 52 of the elongated shaft 51. Both corresponding axial grooves 61 and 75 form together an approximately cylindrical passage. At least one torque-transmitting ball 62 is positioned in each such cylindrical passage. As has been explained for the compression-compensating device 20 the tension-compensating device 60 also has three passages containing the balls 62 in the exemplified embodiment. These three passages are uniformly angularly spaced from each other and each is filled with at least one torque-transmitting ball 62 so that a symmetrical torque transmission is provided.

Between the chuck head 50 and casing 70 is arranged at least one axially tightened spring 63 in the form of the cylindrical helical spring. This spring draws casing 70 axially in the upward direction in the plane of the drawing as far as possible into the cylindrical portion 52 of chuck head 50.

At least the torque-transmitting balls 62 of the tension-compensating device 60 are arranged in a cage formed by the ball-guiding sleeve 64. The latter is positioned between the inner wall of cylindrical portion 52 and the casing 70 and is held between these elements axially immovably so that only an axial rolling movement of the torque-transmitting balls is ensured. The ball-guiding sleeve 64 has for each ball 72 positioned in casing 70 a corresponding axial elongated slot 65. This slot is sufficiently long and its maximally possible length makes the tension-compensation possible. Each holding ball 72 extends radially inwardly into the respective elongated slot 65 and can run together with casing 70 during the axial compensation operation of the tension-compensation device 60.

The cylindrical shaft 51 of the chuck head 50 is formed below the bottom 55 with an inner guide bore 57 coaxial to the central bore 12 of receiving member 12. A pin 80 of the casing 70 is axially slidably guided in guide bore 57. Pin 80 carries an end of a holding screw 77 freely extended through an interior 82 of shaft 51. The holding screw 77 has a head 78 of the enlarged diameter, which forms at the underside thereof a bearing surface for the upper end of spring 63. The lower end of this spring is supported against ring 56 positioned on bottom 55 of cylindrical shaft 51. Therefore it is understood that spring 63 is also loaded with pressure as well as compression spring 23.

The holding screw 77 has a radially extended circular collar 79 formed at the distance in the axial direction from the upper end of pin 80. Circular collar 79 forms a stop or thrust surface which, during the pulling of case 70 out from the cylindrical portion 52 and within the limits of the axial extension, abuts against the ring 56 supported on the bottom 55 within the interior 82 of shaft 51.

Chuck head 50 has on the upper face of cylindrical portion 52 a stop or thrust surface 58 which forms a circular abutment in the transition zone between the upper portion 76 of shaft 51 and its lower portion 52. The abutting surface 58, during the force-loading of the quick-change chuck, and with overcoming the action of the cross-bearing pressure amplifying device 30 and also within the limits of the axial stroke, strikes against the end face 19 formed by the end surface of spindle-receiving member 10 and the end surface of the sleeve 15.

Holding balls 72 release the quick-change insert 71 when, during the axial pulling, the tension-compensation device 60 passes over the entire possible extension length and the holding balls 72 roll outwardly towards the wall of cylindrical portion 52. Then balls 72 travel radially outwardly at least as far that they would no longer extend over the inner peripheral surface of the casing 70 and would leave the circular grooves 74 to thereby release the quick-change insert 71. In order to insert a new quick-change insert into the casing 70 the latter is pulled out into a maximally possible extended position and then moved back.

The compression spring 23 and the tension-responsive spring 63 acting in response to the pressure can have different spring characteristics. The compression spring 23 can be stronger than the tension-responsive spring 63.

As can be seen, the compression-compensating device 20 and the tension compensating device 60 provide for a very large axial length-compensation. The tension-compensating device 60 should be as long as possible and should correspond to the maximal depth of the bore to be tapped so that, with the non-drilled cored hole, the total machine spindle stroke would be permitted to be completed. The tap drill is then supported on the workpiece without cutting in the material. The complete spindle stroke is compensated by the compression-compensating device 20. The entire chuck head 50 is, during this compensation, shifted into bore 12 towards the receiving member 10, against the action of compression spring 23. The engaging balls 22, during this shifting, roll in the corresponding ball passage formed by axial grooves 13 and 21 while torque translation in the chuck is maintained. The compression-compensating device responds to the compression of the spring when a medium compression force, is reached, which exceeds the pressure of the cross-bearing pressure-amplifying device 30 and the ball 31 compressed against the action of spring 33 is pushed out from the groove 32 and rolls against the outer periphery of the shaft 51 upon further displacement of the latter inwardly of the receiving member 10.

If the compensation compression force exerted by means of compression-compensating device 20 decreases the chuck head 50 will automatically move to its initial position due to the reverse movement of the compression spring 23. This initial position of chuck head 50 is shown in FIG. 1. This initial position is play-free because both springs 23 and 63 operate against each other with a certain prestressing.

If an axial tension force is exerted by the quick-change insert 71, for example as a difference between the machine stroke and the thread pitch during the rotating the tap drill out from the threaded hole, then this axial tension force is compensated for by the tension-compensating device 60. Casing 70 is pulled out from the cylindrical portion 52 against the action of the strongly compressed spring 63, whereby the torque-translating balls 62 roll in the corresponding passage formed by respective axial grooves 61 and 75 while the torque-translation in the chuck is maintained. After the balls have travelled over the whole length, then holding balls 72 arrive in the region of the lower inclined end of the inner wall of cylindrical portion 52 so that holding balls 72 can travel radially outwardly from the transverse bores 73 when the quick-change insert 71 is released. This means that after passing the maximal possible extension the quick-change insert 71 is automatically released and the rotation drive is then stopped.

Various procedures during the operation of the above-described thread-cutting quick-change chuck, which require the operation of the compression-compensating device 20 and tension-compensating device 60, are known and not discussed in detail herein. Since the engaging balls 22 and torque-translating balls 62 are positioned in the respective substantially cylindrical passages formed by the corresponding axial grooves a substantially linear contact between the balls and the walls of the grooves is ensured. Therefore balls 22, 62 are not highly loaded. The walls or surfaces forming the grooves are not highly loaded either. Therefore the service life of the chuck is increased. Furthermore, due to the invention there is no danger that the balls be clamped in the radial direction and the entire extension-compensating device would be partially or completely blocked. When the tension-compensating device 60 is provided with only one ball-guiding sleeve 64 the compression-compensating device 20 can also have one sleeve. Due to the provision of the guide within the cage for torque-translating balls 62 the latter are supported vertically at the high level. An easy rolling movement of the balls upon the action of great radial forces is obtained in the device according to the invention.

The advantage of the provision of two prestressed springs 23 and 63 is that the whole device is play-free in the axial direction. The corresponding limiting of the axial movement of the compression-compensating device 20 and tension-compensating device 60 due to the maximal possible lengths is simple and is ensured without additional constructive efforts. A very large axial length-compensation for acting compression forces and for acting tension forces as well is specifically advantageous. The quick-change chuck may be formed of a very small length and very small outer diameter due to the proposed invention. The cross-bearing pressure-amplifying device 30 is easily and inexpensive and also wear-resistant.

Still another significant advantage of the invention resides in the subdivision of the quick-change chuck into two structural components, namely the spindle-receiving member 10 and the chuck head 50. These two structural components can be held on the bearings separately from each other and can be combined or exchanged relative to each other. Various combinations of the differently formed receiving members and chuck heads are possible, the assembling of such separately held structural components can be quick and inexpensive. In the case of wear or damage of the chuck head 50 the replacement of the latter with a new one is possible. The release of chuck head 50 from spindle-receiving member 10 is simple. The total costs of the quick-exchange chucks are reduced due to the subdivision of the chuck into two structural components.

It will be understood that each of the elements described above, or two or more together, may also find a useful application in other types of quick-change chucks differing from the types described above.

While the invention has been illustrated and described as embodied in a quick-change chuck for a tap drill, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a quick-change for a thread cutting tool, comprising a spindle-receiving member (10) for receiving a spindle connected to a machine tool and having a central axis and a free end; a chuck head (50) connected to said free end and having a cylindrical opening (53) axially aligned with said spindle-receiving member; a casing (70) inserted in said opening and releasably coupled with said chuck head; a quick-change insert (71) for holding a thread cutting tool and insertable in said casing, said insert being formed with a peripheral circular groove (74); at least one holding ball (72) engaged in said circular groove, said insert being held in said casing and axially coupled with said casing by said holding ball; means for an axial compensation for a difference between a spindle stroke and a pitch of the thread of the thread cutting tool and positioned between said spindle-receiving member and said casing; at least one return spring (23) positioned between said spindle-receiving member and said chuck head, said axial compensation means enabling an axial displacement of said spindle-receiving member relative to said casing in both axial directions under an extension or contraction against the action of said return spring; and torque-transmitting means for transmitting torque from said chuck head to said casing and including torque-transmitting balls, said casing having at least one axial groove receiving said torque-transmitting balls, the improvement comprising said axial compensating means including a compression-compensating device (20) which compensates for a compression force exerted on the chuck during said displacement and directed towards said spindle-receiving member, and an independent tension-compensating device (60) which compensates for a tension force exerted on the chuck during said displacement and directed away from said spindle-receiving member.

2. The chuck as defined in claim 1, wherein said spindle-receiving member has a central bore (12), said chuck head being axially displaceable in and releasable from said central bore, said cylindrical opening of said chuck head being coaxial with said central bore.

3. The chuck as defined in claim 2, wherein said compression-compensating device is arranged between said spindle-receiving member and said chuck head.

4. The chuck as defined in claim 2, wherein said chuck head includes a cylindrical shaft axially guided in said central bore (12), said shaft (51) having at least one outer axial semicylindrical groove (13), said spindle-receiving member having at least one inner axial semicylindrical groove (21) formed opposite to said outer axial groove so that together said outer and inner grooves form a cylindrical passage, and wherein at least one torque-transmitting ball (22) is provided supported in said cylindrical passage, said return spring being an axially compressible compression spring (23) arranged between said spindle-receiving member and said chuck head.

5. The chuck as defined in claim 4, wherein said cylindrical shaft (51) is hollow and has an interior which is open into said central bore, said compression spring (23) being positioned in said hollow cylindrical shaft and extended partially outwardly therefrom into said central bore, said compression spring having one end and another end, said cylindrical shaft has a bottom surface supporting one end of said compression spring, said spindle-receiving member having in the region of said central bore an abutment supporting said another end of said compression spring.

6. The chuck as defined in claim 5, further including a sleeve (15) inserted in said central bore and surrounding said cylindrical shaft, said sleeve being axially supported in said central bore against said inner axial groove of said spindle-receiving member and forming an end stop for said at least one torque-transmitting ball

(22) upon axial displacement of the chuck head by means of said compression spring in the direction from said spindle-receiving member.

7. The chuck as defined in claim 6, wherein said sleeve is locked in one axial reference position relative to said spindle-receiving member, said sleeve being releasable and removable from said central bore.

8. The chuck as defined in claim 7, further including a threaded screw (16), said spindle-receiving member having a radial threaded bore receiving said screw, said sleeve (15) having a radial hole aligned with said threaded bore which extends radially up to said radial hole.

9. The chuck as defined in claim 8, wherein said threaded screw is hollow.

10. The chuck as defined in claim 9, further including a cross-bearing pressure-amplifying device (30) including an adjustable spring (33) radially extended in said hollow screw, a ball (31) loaded by a force of said spring in a radial direction, said cylindrical shaft (51) being formed at an outer periphery thereof with a recess (32), said loaded ball being engaged in said recess and being pushable away from said recess upon a relative displacement between said spindle-receiving member and said chuck head against the action of the force of said adjustable spring when an axial force of the compression spring is exceeded.

11. The chuck as defined in claim 10, wherein said loaded ball (31) together with said adjustable spring are held within said hollow screw, and wherein an inner hexagonal screw is inserted into said hollow screw for adjusting said adjustable spring.

12. The chuck as defined in claim 11, wherein said chuck head includes a cylindrical portion (52) integral with said cylindrical shaft and provided with said cylindrical opening, said cylindrical portion having an inner wall, said tension-compensating device (60) being positioned between said inner wall and said casing (70) inserted in said cylindrical opening (53).

13. The chuck as defined in claim 12, wherein said cylindrical portion has at least one inner axial semicylindrical groove (61) and said casing has at least one outer axial semicylindrical groove (75) formed opposite to said inner axial groove so that together said inner and outer grooves form another cylindrical passage, and said tension-compensating device including at least one further torque-transmitting ball engaged in said another cylindrical passage, and a tension spring (63) positioned between said chuck head and said casing, said tension spring (63) being axially compressible and acting against a tension force of said compression spring.

14. The chuck as defined in claim 13, wherein at least said the torque-transmitting ball (22) or said further torque-transmitting ball (62) is held in a cage.

15. The chuck as defined in claim 14, wherein said further transmitting ball (62) is held in the cage which is a guide sleeve (64) axially immovably positioned in said cylindrical opening (53) between said casing (70) and said cylindrical portion (52).

16. The chuck as defined in claim 14, wherein said one torque-transmitting ball (22) is held in the cage positioned between said central bore (12) and said cylindrical shaft (51).

17. The chuck as defined in claim 15, wherein said guide sleeve (64) is formed with an axial elongated slot (65), said holding ball (72) engaged in said circular groove (74) being radially extended into said elongated slot.

18. The chuck as defined in claim 17, wherein said cylindrical shaft has an inner guide bore (57) coaxial with said central bore, said casing including an elongated pin (80) coaxial with said cylindrical opening (53), said pin (80) being guided in said guide bore (57), and wherein a holding screw (77) is provided, which is positioned in said hollow cylindrical shaft (51), said holding screw having a stop collar (79) axially spaced from said pin (80), said cylindrical shaft having an inner bottom surface (55), said collar abutting against said bottom surface under the limiting of the length of said axial displacement.

19. The chuck as defined in claim 18, wherein said tension spring (63) is positioned within said hollow cylindrical shaft (51) and coaxially with said compression spring (23), said holding screw having an end stop abutment (78), said tension spring having one end supported against said stop abutment and another end supported against said inner bottom surface (55).

20. The chuck as defined in claim 19, further including a stop ring (56) positioned on said bottom surface and supporting said another end of said tension spring.

21. The chuck as defined in claim 19, wherein said chuck head has an outer abutment surface (58) in a transition zone between said cylindrical shaft and said cylindrical portion, said spindle-receiving member (10) having a stop surface (19) having said abutment surface, said abutment surface under the limiting of the axial displacement abutting against said stop surface.

22. The chuck as defined in claim 19, wherein said holding screw has a head which forms said end stop (78).

* * * * *